US012618028B2

(12) United States Patent
Lebrun

(10) Patent No.: US 12,618,028 B2
(45) Date of Patent: May 5, 2026

(54) FERMENTED AND ESTERIFIED MOLASSES

(71) Applicant: LESAFFRE ET COMPAGNIE, Paris (FR)

(72) Inventor: Xavier Lebrun, Marquette-lez-Lille (FR)

(73) Assignee: LESAFFRE ET COMPAGNIE, Paris (FR)

( * ) Notice: Subject to any disclaimer, the term of this patent is extended or adjusted under 35 U.S.C. 154(b) by 276 days.

(21) Appl. No.: 18/247,316

(22) PCT Filed: Oct. 14, 2021

(86) PCT No.: PCT/FR2021/051792
§ 371 (c)(1),
(2) Date: Mar. 30, 2023

(87) PCT Pub. No.: WO2022/079394
PCT Pub. Date: Apr. 21, 2022

(65) Prior Publication Data
US 2024/0002760 A1 Jan. 4, 2024

(30) Foreign Application Priority Data

Oct. 15, 2020 (FR) ...................................... 2010571

(51) Int. Cl.
*C12G 3/02* (2019.01)
(52) U.S. Cl.
CPC ..................................... *C12G 3/02* (2013.01)
(58) Field of Classification Search
CPC ...................................................... G13G 3/02
(Continued)

(56) References Cited

U.S. PATENT DOCUMENTS 2,785,180 A * 3/1957 Van Julsingha ........ C13B 35/00
548/534
2,868,677 A * 1/1959 Kopke ................... C13B 35/06
127/46.3
(Continued)

FOREIGN PATENT DOCUMENTS

FR 3082522 A1 12/2019
FR 3088930 A1 5/2020
(Continued)

OTHER PUBLICATIONS

International Search Report (English translation included) and written opinion issued on Feb. 9, 2022, in corresponding International Patent Application No. PCT/FR2021/051792; 10 pages.

*Primary Examiner* — Nikki H. Dees
*Assistant Examiner* — Philip A Dubois
(74) *Attorney, Agent, or Firm* — Maier & Maier, PLLC

(57) ABSTRACT

A method for preparing a fermented molasses including at least one glycine betaine ester, the method includes the steps of (1) providing a fermented beet molasses, (2) adding, into this fermented beet molasses, at least one acid in an acid: glycine betaine molar ratio between 1 and 2.2 and (3) esterifying the acidified fermented molasses obtained in the preceding step by mixing with at least one alcohol. Also, a fermented and esterified molasses including betaine esters and the use thereof for improving the surfactant and/or emulsifying properties of a composition.

5 Claims, 3 Drawing Sheets

(58) Field of Classification Search
USPC .......................................................... 426/49
See application file for complete search history.

(56)                      References Cited

U.S. PATENT DOCUMENTS

| 5,454,875 | A | * | 10/1995 | Clarke | .................... C13B 20/06 |
| | | | | | 127/50 |
| 6,384,266 | B1 | * | 5/2002 | Farone | ................. C07C 227/18 |
| | | | | | 560/155 |
| 7,829,521 | B2 | * | 11/2010 | Antoine | ................ A61Q 19/10 |
| | | | | | 510/499 |

FOREIGN PATENT DOCUMENTS

| WO | WO 81/02420 | * | 9/1981 | .......... C07C 101/12 |
| WO | 2013188508 A1 | | 12/2013 | |

* cited by examiner

FERMENTED AND ESTERIFIED MOLASSES

FIELD

The present invention relates to the field of the sugar industry and particularly concerns a novel fermented molasses, its process of preparation and its use as agent for improving the surfactant and/or emulsifying properties of a composition.

BACKGROUND

Glycine betaine ($C_5H_{11}NO_2$) is a molecule from which can be obtained a multitude of derivatives which find diverse and varied applications, in particular in the field of surfactants.

Specifically, glycine betaine, also called trimethylglycine, is an inexpensive natural substance which constitutes a raw material of choice for the preparation of surface-active agents. For example, alkyl betaines or alkyl amido betaines are the most widely used.

The document WO 2015/078890 describes compositions of fatty esters of glycine betaine, esters of glycine betaines and of alkyl polyglucosides which include in particular structures of the type of alkyl polyglucosides carrying a cationic group introduced by virtue of a grafting of glycine betaine.

The document FR 2 869 913 provides, for example, access routes based on ester or amide of glycine betaine, which are obtained in the form of crude reaction products or by washing the crude reaction products with organic solvents.

The document WO 2013/188508 describes compositions containing cationic glycine betaine esters and/or amides. The alkylene betainate methanesulfonates and the betainyl amino alkylene methanesulfonates form part of these esters and of these amides. Glycine betaine esters and amides are used in said compositions of cationic surfactants having antimicrobial activity and are presented as being effective as crude or semi-purified or purified mixtures.

The document FR 3 082 52 describes a surfactant composition comprising a glycine betaine amide salt, an alkylammonium salt, a glycine betaine ester salt and glycine betaine.

The document FR 3 088 930 describes the use of mixtures comprising glycine betaine esters for improving the surfactant properties of the compositions, said glycine betaine esters being obtained by reaction of glycine betaine with a fatty alcohol.

Although a number of glycine betaine derivatives already exist, there remains a need to provide other alternatives which can improve the surfactant and/or emulsifying properties, and in particular green solutions, said to be environmentally friendly, as opposed to the solutions of petrochemical origins far too often employed.

More generally, glycine betaine is a byproduct of the sugar industry and is found in sugar beet molasses, of which it represents approximately 5% to 7% by weight of dry matter, with respect to the total weight of dry matter of said beet molasses.

As mentioned above, glycine betaine is a raw material of choice for the preparation of surface-active agents.

Until now, it has been extracted by manufacturers directly from beet molasses through, for example, chromatographic processes. The glycine betaine thus extracted is concentrated and then used in particular to obtain derivatives, as described above.

The document WO 2004/002938 describes, for example, a method of chromatographic fractionation, followed by a nanofiltration, said method thus making it possible to recover at least a fraction enriched in glycine betaine from a starting solution comprising betaine, for example a molasses solution.

Molasses is a substance known to a person skilled in the art. It is a coproduct resulting from the manufacture of sugar from beet and cane in sugar factories, or brown sugar in refineries. The process for the manufacture of sugar, whether this is carried out starting from cane or beet, results, after the crystallization stage, in sugar being obtained, on the one hand, and molasses being obtained, on the other hand.

Although used to extract glycine betaine, beet molasses is more generally employed for the feeding of animals, mixed with straw or other cellulosic feeds, but also as binder in complete rations for animals, or also to encourage the animal to ingest relatively unpalatable feeds.

As an alternative to the feeding of animals, molasses is also used by manufacturers for the production of "noble" products via fermentation processes. This is because, through the fermentation mechanisms available to certain micro-organisms, molasses can serve as substrate and in particular makes it possible to obtain baker's yeast, ethyl alcohol, citric acid, glutamic acid, lysine or also antibiotics.

In return, the use of molasses via fermentation processes generates large amounts of liquid fermentation residues. These liquid fermentation residues correspond to "fermented" molasses.

Having been depleted in constituents by micro-organisms, fermented molasses is generally regarded as a fermentation residue of little interest, and is mainly upgraded in the field of agriculture as spreading fertilizer.

To extract glycine betaine, fermented molasses is not considered as a product of choice by manufacturers because of the large amounts of water necessary for its extraction but also because of the cost of the chromatographic installations to be employed to carry out the extraction.

However, from the viewpoint of the amounts of fermented molasses produced each year, there also exists a need to provide new ways of upgrading this fermentation residue, regarded until now as a coproduct presenting little attraction, and advantageously to also provide a greener alternative to surfactants of petrochemical origins.

It is thus to the credit of the applicant company to have been able to meet this dual objective by providing a novel preparation process starting from fermented molasses as starting material.

SUMMARY

The present invention thus relates to a process for the preparation of a fermented molasses comprising at least one glycine betaine ester, said process comprising the following stages of:
1) provision of a fermented beet molasses,
2) addition, to said fermented beet molasses, of at least one acid according to an acid/glycine betaine molar ratio of between 1 and 2.2,
3) esterification of the acidified fermented molasses obtained in the preceding stage by mixing with at least one alcohol.

The invention also relates to a fermented and esterified molasses comprising betaine esters and also to its use for improving the surfactant and/or emulsifying properties of a composition.

DETAILED DESCRIPTION

Figure 1:
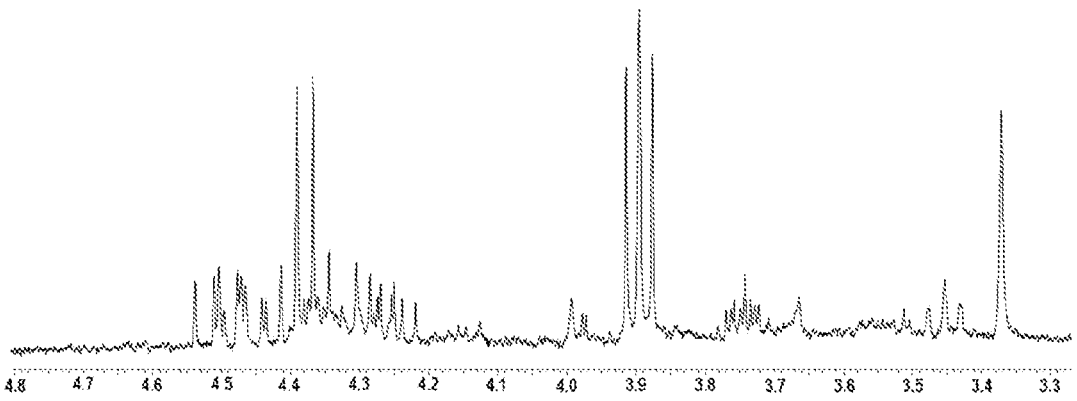
FIG. 1 $^1$H NMR spectrum (CDCl$_3$) of a solution of fermented molasses supplemented with glycine betaine.

As mentioned above, fermented molasses is regarded as a fermentation residue mainly upgraded in the field of agriculture and animal husbandry as spreading fertilizer or in the feeding of animals.

The present invention thus provides a novel way of upgrading fermented molasses via the process described below.

A first subject matter of the invention thus relates to a process for the preparation of a fermented molasses comprising at least one glycine betaine ester, said process comprising the following stages of:

1) provision of a fermented beet molasses,
2) addition, to said fermented beet molasses, of at least one acid according to an acid/glycine betaine molar ratio of between 1 and 2.2,
3) esterification of the acidified fermented molasses obtained in the preceding stage by mixing with at least one alcohol.

Entirely surprisingly, the applicant company has found that fermented beet molasses can be used to carry out an esterification reaction in order to obtain at least one glycine betaine ester.

Fermented beet molasses mainly comprises water. This characteristic constituted until now a prohibitive technical constraint to its direct use as reaction medium for obtaining the betaine ester.

This is because these large amounts of water dissuaded a person skilled in the art from carrying out any esterification reaction, and moreover for esterifying the amounts of glycine betaine present in the fermented beet molasses.

Thus, going against a technical preconception and contrary to what had until now been achieved in the fields of surfactants, the applicant company has demonstrated that glycine betaine esters can be obtained without it being necessary to extract the glycine betaine, and directly from fermented molasses by using it as reaction medium.

This is because, in the particular field of surfactants, manufacturers have mainly resorted to the extraction of the glycine betaine from beet molasses, then to the implementation of different reactions on the extracted glycine betaine, so as to obtain betaine derivatives, in particular glycine betaine esters.

In addition, as mentioned above, fermented molasses is not a product of choice for large-scale extraction of glycine betaine due to the large amounts of water required for its extraction.

By providing a preparation process which makes it possible to directly esterify glycine betaine within fermented molasses, without prior extraction, so as to obtain glycine betaine esters, the applicant company goes against the practices conventionally employed in the field of surfactants.

The fermented molasses comprising one or more glycine betaine esters obtained at the end of the process according to the invention can then be used directly for improving the surfactant and/or emulsifying properties of a composition.

Entirely advantageously, the preparation process according to the invention thus makes it possible to make use of and recycle a part of the large volumes of fermented molasses produced by manufacturers by carrying out an in situ esterification of the glycine betaine still present in said fermented molasses.

The preparation process according to the invention thus makes it possible to provide a way of upgrading fermented molasses and to obtain a novel coproduct finding a particularly advantageous application for improving the emulsifying and/or surfactant properties of a composition.

The preparation process according to the invention comprises a first stage of provision of fermented beet molasses.

As mentioned above, fermented molasses is a coproduct of molasses which is obtained after fermentation of molasses by bacteria, yeasts or fungi, said fermentation making it possible to obtain "noble" products, such as baker's yeast, ethyl alcohol or also citric acid and glutamic acid.

Generally, fermented molasses can be obtained from a beet molasses or from a cane molasses.

According to the invention, fermented molasses is obtained from beet molasses because cane molasses does not comprise glycine betaine. The fermented molasses according to the invention is thus a fermented beet molasses.

Preferably, the fermented beet molasses is obtained via the fermentation of the beet molasses by yeasts.

According to a particular embodiment, the fermented beet molasses can also be a mixture of fermented beet molasses and fermented cane molasses. In such a mixture, the glycine betaine is then contributed by the fermented beet molasses.

According to this particular embodiment, the mixture can contain up to 70% by weight of fermented beet molasses, up to 80% by weight of fermented beet molasses, up to 90% by weight of fermented beet molasses, indeed even 95% by weight of fermented beet molasses. The remainder is constituted of fermented cane molasses.

As mentioned above, fermented molasses contains mainly water, namely more than 90% by weight, with respect to the total weight. This large amount of water has until now constituted a technical obstacle which dissuaded manufacturers from using it for esterification reactions.

Advantageously, the fermented molasses can be concentrated in order to reduce the amount of water and to obtain higher contents of dry matter.

According to a particular embodiment, the fermented molasses can be concentrated until a dry matter content of from 45% to 80% is obtained. Preferably, the dry matter content of the fermented molasses is from 50% to 75% and very particularly from 55% to 65%, such as, for example, approximately 60%.

According to another particular embodiment, the fermented beet molasses supplied according to the first stage of the process is a demineralized fermented molasses. The demineralization can, for example, consist of a precipitation of potassium sulfate (K$_2$SO$_4$), sodium sulfate (Na$_2$SO$_4$), magnesium sulfate (MgSO$_4$) and calcium sulfate (CaSO$_4$) salts by addition of sulfuric acid.

Advantageously, the demineralization makes it possible to increase the proportion of the organic matter within the fermented molasses and to increase the proportion of glycine betaine, with respect to the total dry matter in the fermented molasses.

Conventionally, since it is intended or was used as fertilizer and in the feeding of animals, fermented beet molasses can also be defined by its distribution of nitrogenous substances and by its aminogram.

Consequently, the fermented molasses according to the invention can thus exhibit a distribution of nitrogenous substances as below:

nitrogen of the total amino acids, determined by the Kjeldahl method: 25% to 50% of the total nitrogen,
betaine nitrogen: 40% to 50% of the total nitrogen,
ammoniacal nitrogen: 2% to 3% of the total nitrogen.

The preparation process according to the invention subsequently comprises a stage of addition, to the fermented molasses, of at least one acid according to an acid/glycine betaine molar ratio of between 1 and 2.2.

A person skilled in the art is in a position to determine, via known methods, the amount of glycine betaine present in the fermented molasses in order to add the acid thereto according to the required molar ratio.

This acidification stage is thus carried out in such a way as to reduce the pH of the fermented beet molasses to a value below the $pK_a$ of glycine betaine and of the carboxylic acids present in said molasses.

The acidified fermented molasses thus exhibits a pH which can be of from 1.1 to 1.7 and preferably a pH of from 1.2 to 1.6.

According to a particular embodiment, the acid employed is sulfuric acid or methanesulfonic acid.

The third stage of the process according to the invention consists of a stage of esterification of the acidified fermented molasses by mixing with at least one alcohol.

This mixing stage employs at least one alcohol, that is to say a single alcohol or an alcohol mixture.

The alcohol is employed according to an amount in excess, with respect to the glycine betaine. Thus, the alcohol is advantageously added according to an alcohol/glycine betaine molar ratio of between 1 and 2.5, preferably of between 1.5 and 2.3.

According to this stage, the mixing is carried out under conditions making it possible to obtain an esterification reaction between the carboxylic acid functions of the glycine betaine contained in the acidified fermented molasses and the at least one alcohol employed.

In other words, this stage makes it possible to obtain betaine esters from the glycine betaine present within the fermented and acidified beet molasses.

Esterification is a reaction well known to a person skilled in the art. The conditions of the mixing in order to obtain such a reaction are thus easily adapted by the person skilled in the art.

For example, the mixture of the acidified fermented molasses according to the invention with at least one alcohol can be refluxed at a temperature of from 100° C. to 120° C. and for a period of time of 2 h to 3 h.

The alcohol used has an influence on the betaine ester which is obtained. A person skilled in the art is in a position to choose the alcohol or the alcohol mixture so as to obtain the desired betaine ester(s).

According to a particular embodiment, the alcohol employed is chosen from the group consisting of ethanol, glycerol, lauryl alcohol (dodecan-1-ol), isoamyl alcohol (3-methylbutan-1-ol), oleyl alcohol, stearyl alcohol, fusel alcohols and their mixtures. Preferably, the alcohol is ethanol, oleyl alcohol or lauryl alcohol.

The fusel alcohols are a mixture of higher and lower alcohols, fatty alcohols, terpenes and furfural. They are formed by alcoholic fermentation as byproducts of metabolism.

According to another particular embodiment, the alcohol employed is a fatty alcohol having a $C_3$ to $C_{30}$ chain, which are saturated or unsaturated, such as, for example, octanol, nonanol, undecanol, dodecanol or also tridecanol.

According to this particular embodiment, the esterification reaction between the fermented molasses and the fatty alcohol generates two distinct phases. A gel phase exhibiting a pasty appearance and comprising the glycine betaine esters, and a liquid phase comprising the unreacted excess fatty alcohol.

The process according to the invention thus makes it possible to directly esterify the glycine betaine contained in the fermented molasses by using the latter as reaction medium, without a prior extraction stage. At the end of the process, a fermented and esterified molasses is thus obtained.

The process according to the invention thus makes it possible to obtain a fermented beet molasses comprising one or more esters of glycine betaine and esters of other carboxylic acids.

According to a particular embodiment, when the esterification reaction has ended, the process according to the invention comprises a centrifugation stage. Advantageously, and when the fermented molasses employed according to the first stage of the process is not a demineralized molasses, this centrifugation stage makes it possible to remove the precipitates and the sulfate inorganic salts.

After the centrifugation, the supernatant is recovered and then concentrated so as to obtain a dry matter content of from 50% to 80% and preferably a dry matter content of from 60% to 70%.

According to a particular embodiment, the process according to the invention comprises a stage of recovery of the glycine betaine esters. This recovery stage can be carried out after the esterification stage or after the centrifugation stage.

According to this particular embodiment, the recovery can advantageously be carried out by an extraction.

Another subject matter of the present invention relates to a fermented beet molasses, said fermented molasses being esterified and comprising one or more glycine betaine esters.

The fermented molasses is described as esterified because it comprises one or more glycine betaine esters.

The fermented and esterified beet molasses comprising one or more betaine esters according to the invention is capable of being obtained by the process described above.

Another subject matter of the invention relates to the use of the fermented and esterified beet molasses for improving the surfactant and/or emulsifying properties of a composition.

Because of the cationic esters which it contains, the fermented and esterified beet molasses according to the invention can be used in any type of composition conventionally employing cationic esters.

For example, the fermented and esterified beet molasses according to the invention can be used as antistatic for automotive detergent composition, as foaming agent for liquid detergent, as corrosion inhibitor for pipeline, for bituminous emulsions, as antifungal and wetting agent for plant-protection adjuvant, or also as foaming agent and antistatic in shampoos.

Fermented molasses is used in addition to or in complete or partial replacement of the emulsifiers and/or surfactants of petrochemical origin generally used in compositions.

The fermented and esterified molasses according to the invention also covers a wide range of applications in the field of emulsification, such as in the petroleum industry, in the paint, pigment and varnish industry or also in the construction industry and civil engineering.

A better understanding of the invention will be obtained with the help of the implementational examples and of the figures below, which are meant to be purely illustrative and in no way limit the scope of the protection.

EXAMPLES

Example 1: Preparation of Glycine Betaine Ester from Lauryl Alcohol (C$_{12}$)

The fermented molasses used for this example is a demineralized molasses exhibiting the following characteristics:
pH 3,
78% by weight of dry matter, with respect to the total dry matter,
approximately 19% by weight of glycine betaine, with respect to the total weight of the fermented molasses.

An amount of this fermented molasses is acidified with constant stirring in a 250 ml round-bottomed flask with 2.4 molar equivalents of sulfuric acid (96% concentrated) with respect to the glycine betaine. The combined mixture is homogenized.

The lauryl alcohol is subsequently added to the round-bottomed flask according to an alcohol/glycine betaine molar ratio of 1.5 and the combined mixture is again homogenized.

The round-bottomed flask is placed under a hot rotary evaporator (90° C.) and under reduced pressure (100 mbar) with stirring from 100 to 150 rpm.

After 3 hours, the reaction is halted by immersing the round-bottomed flask in ice-cold water.

At the end of the reaction, the fermented and esterified molasses comprising glycine betaine esters exhibits a homogeneous appearance.

In order to confirm the presence of glycine betaine ester in the fermented and esterified molasses, a $^1$H NMR analysis in deuterated chloroform (CDCl$_3$) is carried out and the result is compared with control solutions.

The solutions analyzed by $^1$H NMR are shown below:
1: Fermented beet molasses enriched in glycine betaine (control),
2: Diethyl ether solution containing lauryl betainate ester (control),
3: Fermented molasses esterified with lauryl alcohol in the presence of H$_2$SO$_4$.

Figure 2:
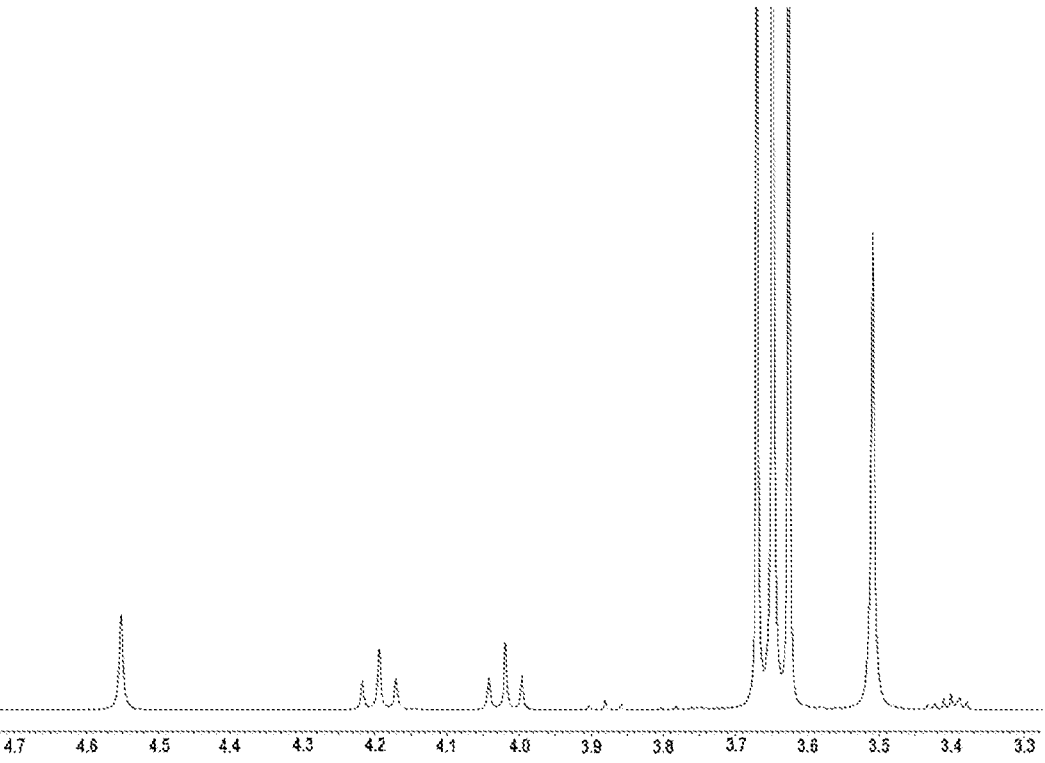
FIG. 2 $^1$H NMR spectrum (CDCl$_3$) of a diethyl ether fraction containing lauryl betainate ester.
Figure 3:
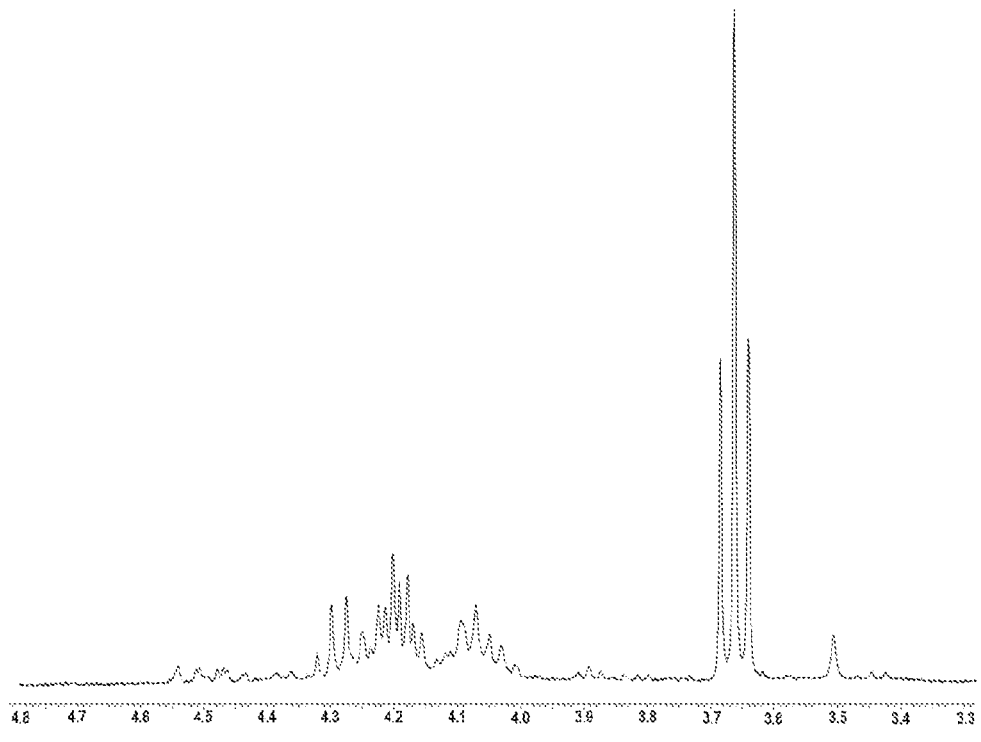
FIG. 3 $^1$H NMR spectrum (CDCl$_3$) of fermented molasses esterified with lauryl alcohol in the presence of H$_2$SO$_4$.

The results of the $^1$H NMR analyses of each of the solutions 1 to 3 are respectively presented in FIGS. 1 to 3.

The control spectrum of FIG. 1 exhibits a peak at 3.37 ppm characteristic of glycine betaine.

The spectrum of FIG. 2 also serves as control and to identify the peak characteristic of glycine betaine esterified with lauryl alcohol (lauryl betainate) at 3.51 ppm, and also three peaks between 3.6 and 3.7 ppm which are characteristic of lauryl alcohol.

The spectrum obtained with the fermented and esterified molasses exhibits a peak at approximately 3.5 ppm and confirms the presence of the lauryl betainate ester. In addition, the absence of characteristic peak at 3.37 ppm makes it possible to say that the majority of the glycine betaine reacted during the esterification reaction to form the glycine betaine esters (FIG. 3).

Together, these results confirm that the process according to the invention makes it possible to obtain glycine betaine esters from fermented molasses, said fermented molasses being used directly as reaction medium.

Example 2: Preparation of Glycine Betaine Ester from Oleyl Alcohol (C$_{18}$)

The fermented molasses used for this example is a demineralized molasses exhibiting the following characteristics:
pH 3,
78% by weight of dry matter, with respect to the total dry matter,
approximately 19% by weight of glycine betaine, with respect to the total weight of the fermented molasses.

An amount of this fermented molasses is acidified with sulfuric acid (96% concentrated) under constant stirring in a 250 ml round-bottomed flask according to an acid/glycine betaine molar ratio equal to 2, then the combined mixture is homogenized.

Subsequently, the oleyl alcohol is added to the round-bottomed flask according to an alcohol/glycine betaine molar ratio equal to 1.5, then the combined mixture is again homogenized.

The round-bottomed flask is placed under a hot rotary evaporator (90° C.) and under reduced pressure (100 mbar) with stirring from 100 to 150 rpm.

After 5 hours, the reaction is halted by immersing the round-bottomed flask in ice-cold water.

At the end of the reaction, the fermented and esterified molasses comprising glycine betaine esters exists in two phases, a gel phase and a liquid phase.

In order to confirm the presence of glycine betaine ester in the fermented and esterified molasses, $^1$H NMR analyses are carried out on the different phases obtained and the results are compared with control solutions.

The solutions analyzed are listed below:
A: Liquid phase of the fermented molasses esterified with an oleyl alcohol,
B: Diethyl ether solution containing the lauryl betainate,
C: Fermented molasses esterified with a lauryl alcohol (C$_{12}$) in the presence of H$_2$SO$_4$ (control).
D: Solution of fermented molasses supplemented in glycine betaine (control),
E: Gel phase of the fermented and esterified molasses.

Figure 4:
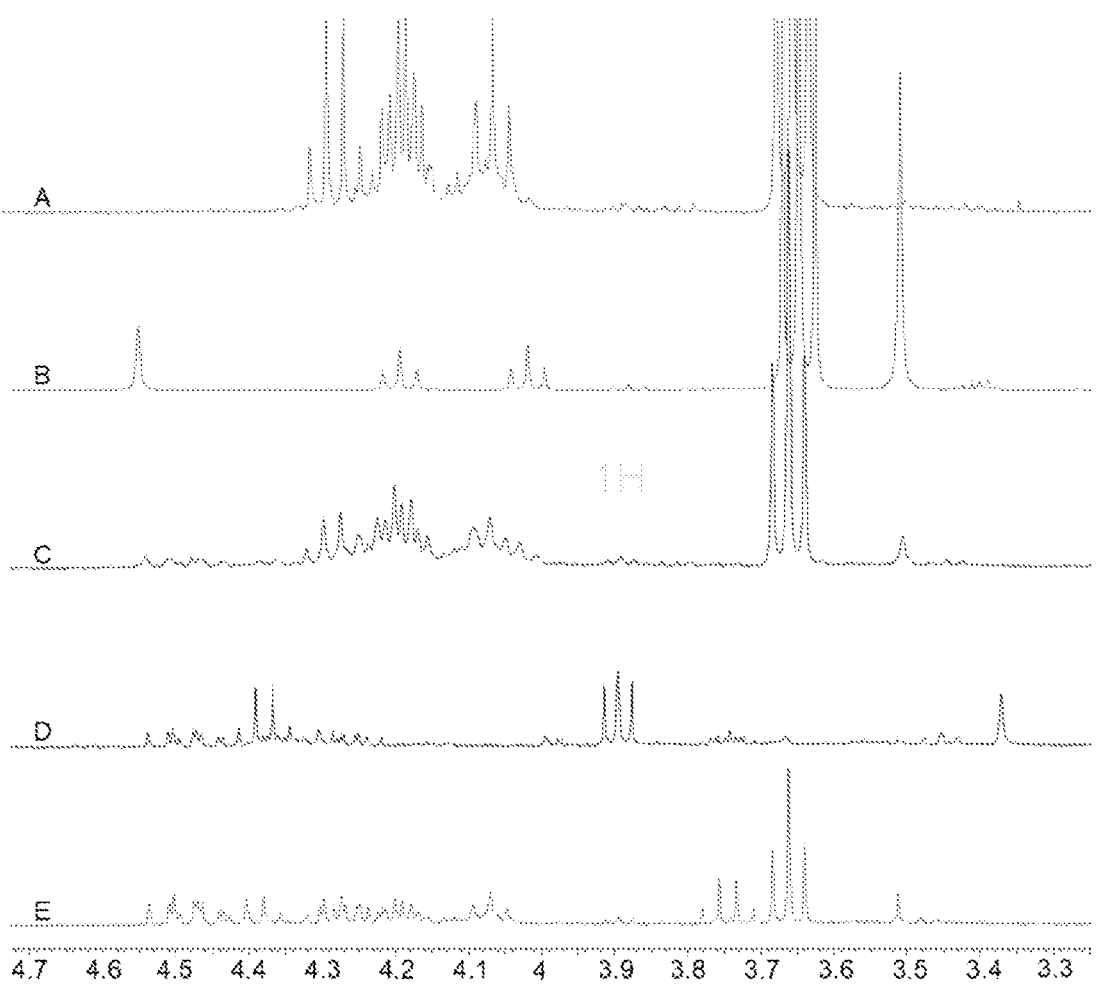
FIG. 4 Superimposition of $^1$H NMR spectra. A: $^1$H NMR spectrum (CDCl$_3$) of the liquid phase of the fermented molasses esterified with an oleyl alcohol; B: $^1$H NMR spectrum of a diethyl ether solution containing lauryl betainate; C: $^1$H NMR spectrum (CDCl$_3$) of a fermented molasses esterified with a lauryl alcohol in the presence of H$_2$SO$_4$ (control); D: $^1$H NMR spectrum (CDCl$_3$) of a solution of fermented molasses supplemented with glycine betaine (control); E: $^1$H NMR spectrum (CDCl$_3$) of the gel phase of the fermented molasses esterified with oleyl alcohol.

The results of the $^1$H NMR analyses of each of the solutions A to E are presented in FIG. 4.

The spectrum D makes it possible to identify the position of the peak characteristic of glycine betaine at 3.37 ppm.

Glycine betaine esters exhibit substantially the same chemical shift whatever the alcohol used for the esterification. Consequently, the spectra B and C are used as controls with the characteristic peak of the lauryl betainate ester at 3.51 in order to identify the presence of the oleyl betainate ester.

The absence of the peak characteristic of glycine betaine on the spectra A and E indicates that it has been predominantly consumed within the fermented molasses during the esterification reaction to form the glycine betaine esters. The oleyl betaine esters are found only in the gel phase of the fermented and esterified molasses, as is evidenced by the presence of the peak at 3.51 ppm on the spectrum E, said peak being absent on the spectrum A of the liquid phase.

Again, the results confirm that it is possible to obtain glycine betaine esters from fermented molasses, said fermented molasses being used directly as reaction medium.

Thus, going against what has until now been accepted, the applicant company proves that it is possible to carry out an esterification reaction starting from fermented molasses, thus obtaining glycine betaine esters after addition of alcohol.

Example 3: Preparation of Glycine Betaine Ester from Fermented Molasses and Ethanol A volume of fermented beet molasses is acidified with sulfuric acid down to pH 1.9.

The acidified fermented molasses is subsequently mixed either with 1.1 molar equivalents of ethanol, with respect to the glycine betaine, (mixture 1), or with 5% by weight of glycerol (mixture 2).

The two mixtures are refluxed at 110° C. for 2 h 30.

Subsequently, a centrifugation stage is carried out at 20° C. for 10 min at 8000 rev/min in order to remove the precipitates and the sulfate inorganic salts. The supernatant is recovered, then concentrated by evaporation until a dry matter of approximately 65% is obtained, and the presence of glycine betaine esters was confirmed by $^1$H NMR measurements.

The invention claimed is:

1. A process for the preparation of fermented molasses comprising at least one glycine betaine ester, said process comprising the following stages of:

1) provision of a fermented beet molasses, 2) addition, to said fermented beet molasses, of at least one acid according to an acid/glycine betaine molar ratio of between 1 and 2.2, 3) esterification of the acidified fermented molasses obtained in the preceding stage by mixing with at least one alcohol, and wherein, after the esterification stage 3), a stage of centrifugation and concentration of the supernatant to a dry matter content of from 50% to 80%, and wherein the fermented beet molasses supplied according to the first stage is a fermented and demineralized molasses.

2. The process as claimed in claim 1, wherein the fermented beet molasses is a mixture of fermented beet molasses and fermented cane molasses.

3. The process as claimed in claim 1, wherein the alcohol is mixed with the acidified fermented molasses according to an alcohol/glycine betaine molar ratio of between 1 and 2.5.

4. The process as claimed in claim 1, wherein the alcohol is selected from the group consisting of ethanol, glycerol, lauryl alcohol (dodecan-1-ol), isoamyl alcohol (3-methylbutan-1-ol), oleyl alcohol, stearyl alcohol, fusel alcohols and mixtures thereof.

5. The process as claimed in claim 1, wherein the alcohol is selected from the group consisting of from ethanol, oleyl alcohol, lauryl alcohol, and mixtures thereof.

* * * * *